UNITED STATES PATENT OFFICE.

WILLIAM STONE, OF BOSTON, MASSACHUSETTS, ASSIGNOR TO HIMSELF AND WILLIAM TAYLOR, OF SAME PLACE.

IMPROVEMENT IN PROCESSES OF PRESERVING MEAT.

Specification forming part of Letters Patent No. 187,930, dated February 27, 1877; application filed January 19, 1877.

*To all whom it may concern:*

Be it known that I, WILLIAM STONE, of Boston, in the county of Suffolk and State of Massachusetts, have invented a new and useful Improvement in the Art of Curing Meats; and do hereby declare the same to be fully described as follows:

The invention is specially intended for curing hams or sides of pork, though it is useful for various other meats.

In carrying out my process, I first cover the ham or piece of meat with chloride of sodium, and continue to do this more or less every day for about three weeks, or until the meat may be thoroughly salted.

Instead of this the meat may be immersed in a solution of brine or the chloride for a sufficient period.

Generally I use a small amount of nitrate of potash with the salt, and particularly in or about the bone or bones, should there be any in the meat.

Having done this, the meat is to be wiped with a cloth or other means, to remove from its outer surface the surplus salt. Next the meat is to be covered with malt, the covering having a thickness of about six inches, after which steam is to be thrown into and through the malt for about twenty-four hours, after which the meat is to be removed from the steamed malt, and wiped or cleansed of that which may be upon it. Finally, the meat is to be buried in a mass of dry malt, and there suffered to remain about fourteen days. After having been removed therefrom, the meat may be suspended on a hook or hooks, and subjected to the atmosphere, in order to desiccate it, as may be desirable.

From the above, it will be seen that in the process of curing meat I do not employ smoke or any of its constituents, the meat, when cured, having a very different flavor from smoked meat.

I claim—

The new and useful or improved process, substantially as described, of curing meat, such consisting in first treating it with chloride of sodium, or such and nitrate of potash, and next subjecting it to the action of steam and malt, and finally to that of malt alone, all essentially as explained.

WILLIAM STONE.

Witnesses:
R. H. EDDY,
S. N. PIPER.